(12) United States Patent
Liu et al.

(10) Patent No.: US 12,347,068 B2
(45) Date of Patent: Jul. 1, 2025

(54) METHOD, DEVICE, AND COMPUTER PROGRAM PRODUCT FOR IMAGE PROCESSING

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 367 days.

(21) Appl. No.: 18/127,199

(22) Filed: Mar. 28, 2023

(65) Prior Publication Data

US 2024/0281926 A1 Aug. 22, 2024

(30) Foreign Application Priority Data

Feb. 20, 2023 (CN) .......................... 202310181589.9

(51) Int. Cl.
*G06T 3/4061* (2024.01)
*G06N 3/0455* (2023.01)
(Continued)

(52) U.S. Cl.
CPC ......... *G06T 3/4061* (2013.01); *G06N 3/0455* (2023.01); *G06T 3/4046* (2013.01); *G06T 3/4053* (2013.01)

(58) Field of Classification Search
CPC ... G06T 3/4046; G06T 3/4053; G06T 3/4061; G06T 2207/20081; G06T 2207/20084; G06N 3/045; G06N 3/0455
See application file for complete search history.

(56) References Cited

U.S. PATENT DOCUMENTS

| | | | |
|---|---|---|---|
| 2021/0342974 A1* | 11/2021 | Zhang | G06T 3/4046 |
| 2022/0092350 A1* | 3/2022 | Liou | G06V 10/75 |
| 2023/0098437 A1* | 3/2023 | Li | G06T 7/30 |
| | | | 382/299 |

OTHER PUBLICATIONS

Liu, Zhi-Song, Wan-Chi Siu, and Li-Wen Wang. "Variational Auto Encoder for Reference based Image Super-Resolution." 2021 IEEE/CVF Conference on Computer Vision and Pattern Recognition Workshops (CVPRW). IEEE, 2021. (Year: 2021).*

(Continued)

*Primary Examiner* — Geoffrey E Summers
(74) *Attorney, Agent, or Firm* — Ryan, Mason & Lewis, LLP

(57) ABSTRACT

Embodiments of the present disclosure relate to a method, a device, and a computer program product for image processing. The method includes: obtaining an encoding feature of a reference image and an encoding feature of an input image of a first resolution, wherein the reference image has a resolution greater than the first resolution. The method further includes: obtaining high-frequency information and low-frequency information on the input image by interpolating the input image; obtaining a first output feature based on the encoding feature of the reference image and the high-frequency information; and obtaining a second output feature based on the encoding feature of the input image and the low-frequency information. The method further includes: generating an output image of a second resolution based on the first output feature and the second output feature, wherein the second resolution is greater than the first resolution.

20 Claims, 6 Drawing Sheets

(51) Int. Cl.
  *G06T 3/4046* (2024.01)
  *G06T 3/4053* (2024.01)

(56) References Cited

OTHER PUBLICATIONS

Sun, Wanjie, and Zhenzhong Chen. "Learning discrete representations from reference images for large scale factor image super-resolution." IEEE Transactions on Image Processing 31 (2022): 1490-1503. (Year: 2022).*

Daniel, Tal, and Aviv Tamar. "Soft-IntroVAE: Analyzing and Improving the Introspective Variational Autoencoder." arXiv preprint arXiv:2012.13253v2 (2020). (Year: 2021).*

Chen, Yinbo, Sifei Liu, and Xiaolong Wang. "Learning Continuous Image Representation with Local Implicit Image Function." 2021 IEEE/CVF Conference on Computer Vision and Pattern Recognition (CVPR). IEEE, 2021. (Year: 2021).*

Fritsche, Manuel, Shuhang Gu, and Radu Timofte. "Frequency separation for real-world super-resolution." 2019 IEEE/CVF International Conference on Computer Vision Workshop (ICCVW). IEEE, 2019. (Year: 2019).*

Li, Shanshan, et al. "Frequency separation network for image super-resolution." IEEE Access 8 (2020): 33768-33777. (Year: 2020).*

Prost, Jean, et al. "Diverse super-resolution with pretrained deep hiererarchical variational autoencoders." arXiv preprint arXiv: 2205.10347v2 (2022). (Year: 2022).*

C. Dong et al., "Image Super-Resolution Using Deep Convolutional Networks," IEEE Transactions on Pattern Analysis and Machine Intelligence, arXiv:1501.00092v3, Jul. 31, 2015, 14 pages.

J. Kim et al., "Accurate Image Super-Resolution Using Very Deep Convolutional Networks," IEEE Conference on Computer Vision and Pattern Recognition (CVPR), arXiv:1511.04587v2, Nov. 11, 2016, 9 pages.

W.-S. Lai et al., "Deep Laplacian Pyramid Networks for Fast and Accurate Super-Resolution," IEEE Conference on Computer Vision and Pattern Recognition (CVPR), arXiv:1704.03915v2, Oct. 9, 2017, 9 pages.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

B. Lim et al., "Enhanced Deep Residual Networks for Single Image Super-Resolution," IEEE Conference on Computer Vision and Pattern Recognition (CVPR), arXiv:1707.02921v1, Jul. 10, 2017, 9 pages.

Y. Zhang et al., "Image Super-Resolution Using Very Deep Residual Channel Attention Networks," European Conference on Computer Vision, arXiv:1807.02758v2, Jul. 12, 2018, 16 pages.

Y. Zhang et al., "Residual Dense Network for Image Super-Resolution," IEEE/CVF Conference on Computer Vision and Pattern Recognition, arXiv:1802.08797v2, Mar. 27, 2018, 10 pages.

M. Haris et al., "Deep Back-Projection Networks for Single Image Super-resolution," IEEE Transactions on Pattern Analysis and Machine Intelligence, arXiv:1904.05677v2, Jun. 13, 2020, 14 pages.

Z.-S. Liu et al., "Hierarchical Back Projection Network for Image Super-Resolution," IEEE/CVF Conference on Computer Vision and Pattern Recognition, arXiv:1906.06874v2, Jun. 20, 2019, 10 pages.

Z.-S. Liu et al., "Image Super-Resolution via Attention based Back Projection Networks," IEEE/CVF Conference on Computer Vision and Pattern Recognition, arXiv:1910.04476v, Oct. 10, 2019, 9 pages.

T. Dai et al., "Second-order Attention Network for Single Image Super-Resolution," Proceedings of the IEEE Conference on Computer Vision and Pattern Recognition, Jun. 1, 2019, 10 pages.

B. Niu et al., "Single Image Super-Resolution via a Holistic Attention Network," European Conference on Computer Vision, arXiv:2008.08767v1, Aug. 20, 2020, 16 pages.

I. J. Goodfellow et al., "Generative Adversarial Nets," Advances in Neural Information Processing Systems, arXiv:1406.2661v1, Jun. 10, 2014, 9 pages.

Z. Liu et al., "Photo-Realistic Image Super-Resolution via Variational Autoencoders," IEEE Transactions on Circuits and Systems for Video Technology, vol. 31, No. 4, Apr. 2021, 15 pages.

Z.-S. Liu et al., "Reference Based Face Super-Resolution," IEEE Access, vol. 7, Sep. 23, 2019, pp. 129112-129126.

J. Engel et al., "Latent Constraints: Learning to Generate Conditionally from Unconditional Generative Models," arXiv:1711.05772v2, Dec. 21, 2017, 22 pages.

Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.

X. Wang et al., "ESRGAN: Enhanced Super-Resolution Generative Adversarial Networks," IEEE Conference on Computer Vision and Pattern Recognition, Sep. 2018, 16 pages.

U.S. Appl. No. 17/993,328, filed in the name of Zhisong Liu et al. on Nov. 23, 2022, and entitled "Method, Electronic Device, and Computer Program Product for Image Processing."

* cited by examiner

METHOD, DEVICE, AND COMPUTER PROGRAM PRODUCT FOR IMAGE PROCESSING

RELATED APPLICATION

The present application claims priority to Chinese Patent Application No. 202310181589.9, filed Feb. 20, 2023, and entitled "Method, Device, and Computer Program Product for Image Processing," which is incorporated by reference herein in its entirety.

FIELD

Embodiments of the present disclosure generally relate to the technical field of computers, and more specifically to a method, a device, and a computer program product for image processing.

BACKGROUND

With the development of deep learning, applications in the field of image processing have increased and can achieve better processing results than traditional techniques. Image super-resolution is an important direction in the field of image processing. Image super-resolution refers to the reconstruction of a corresponding high-resolution image from an observed low-resolution image by means of software or hardware methods, and has important application value in the fields of surveillance equipment, satellite image remote sensing, digital high definition, microscopic imaging, video encoded communication, video restoration, and medical imaging.

Image super-resolution reconstruction is concerned with restoring missing details in an image, such as high-frequency information. In a large number of image processing fields, people often expect to obtain high-resolution images. However, due to limitations of devices and sensors, and for other reasons, the images obtained are often low-resolution images. For example, super-resolution processing can be performed using interpolation-based methods, reconstruction-based methods, and machine learning methods, and with the development of technology, deep learning is increasingly applied to image super-resolution processing.

SUMMARY

Embodiments of the present disclosure provide a method, a device, and a computer program product for image processing.

In one aspect of the present disclosure, a method for image processing is provided. The method includes: obtaining an encoding feature of a reference image and an encoding feature of an input image of a first resolution, wherein the reference image has a resolution greater than the first resolution; obtaining high-frequency information and low-frequency information on the input image by interpolating the input image; obtaining a first output feature based on the encoding feature of the reference image and the high-frequency information; and obtaining a second output feature based on the encoding feature of the input image and the low-frequency information; and generating an output image of a second resolution based on the first output feature and the second output feature, wherein the second resolution is greater than the first resolution.

In another aspect of the present disclosure, an electronic device is provided. The electronic device includes a processor and a memory coupled to the processor. The memory has instructions stored therein which, when executed by the processor, cause the electronic device to execute actions comprising: obtaining an encoding feature of a reference image and an encoding feature of an input image of a first resolution, wherein the reference image has a resolution greater than the first resolution; obtaining high-frequency information and low-frequency information on the input image by interpolating the input image; obtaining a first output feature based on the encoding feature of the reference image and the high-frequency information; and obtaining a second output feature based on the encoding feature of the input image and the low-frequency information; and generating an output image of a second resolution based on the first output feature and the second output feature, wherein the second resolution is greater than the first resolution.

In still another aspect of the present disclosure, a computer program product is provided. The computer program product is tangibly stored on a non-transitory computer-readable medium and comprises machine-executable instructions, wherein the machine-executable instructions, when executed by a machine, cause the machine to perform a method or process according to embodiments of the present disclosure.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
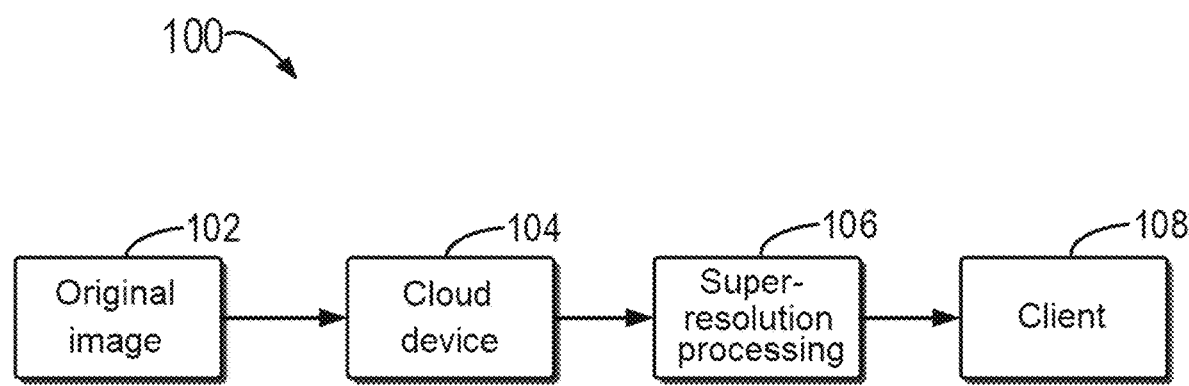
FIG. 1 illustrates a schematic diagram of an example environment in which embodiments of the present disclosure can be implemented.

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

In addition, all specific numerical values herein are examples, which are provided only to aid in understanding, and are not intended to limit the scope.

Conventionally, reconstruction of image details can be achieved by processing edges and textures of an image. However, conventional image reconstruction methods are not capable of producing sharp and clear super-resolution images. In addition, in image super-resolution processing, current techniques only perform low resolution enlargement processing, such as 2× and 4×, but not continuous-scale resolution enlargement.

To address the above and other potential problems, embodiments of the present disclosure provide a method for image processing. The method includes: constructing a model using a reference image, an original low-resolution image, and an original high-resolution image as model inputs and a super-resolution image as output during training, where the reference image is a predefined image containing edges and textures for image super-resolution processing, and the model complements edge and texture information on the low-resolution image by learning edge and texture information in the reference image and achieves continuous-scale resolution enlargement. In application, a low-resolution image is directly input and is combined with the reference image, and the trained model is used to obtain the corresponding super-resolution image to achieve a sharp and clear super-resolution image reconstruction and achieve continuous-scale enlargement of the low-resolution image.

Basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 illustrates a schematic diagram of an example environment 100 in which embodiments of the present disclosure can be implemented. The example environment 100 includes an original image 102, a cloud device 104, super-resolution processing 106, and a client 108. It should be understood that the numbers, the arrangement, and the processing process of devices and images illustrated in FIG. 1 are only examples, and that the example system may include different numbers of devices, images, and processing processes that are arranged in different manners, various additional elements, etc.

The example environment 100 includes the original image 102, where the original image 102 may include one or more images having any resolution, any content, any format type, and any number, and the present disclosure is not limited in this regard. For example, the original image 102 may have different resolutions, such as 720P, 1080P, 4K, 8K, etc., and the present disclosure does not limit the content of the image. The original image 102 may include an image stored by a user or an image captured by a user, and the present disclosure does not limit the source of images, the way in which images are acquired, the content of images, and other aspects.

The example environment 100 includes the cloud device 104, wherein the cloud device may include any public cloud, private cloud or hybrid cloud, community cloud, distributed cloud, inter-cloud, multi-cloud, or any combination thereof, and the present disclosure is not limited in this regard. The cloud device 104 may also have the characteristics of providing computing power according to a user's needs, being compatible with different software or hardware, and the like. Additionally or alternatively, any localized architecture may be used to implement the cloud device 104. A user first uploads the original image 102 to the cloud device 104 for preservation or access by others. During this process, the original image is often compressed due to performance and storage space limitations, resulting in a reduction in the resolution of the original image 102 and missing of some details of edges and textures.

The example environment 100 further includes the super-resolution processing 106, wherein the super-resolution processing may be accomplished by any computing device provided in the example environment 100, and the present disclosure is not limited in this regard. For example, the super-resolution processing 106 may be implemented on the cloud device 104, or it may be implemented on the client 108. By deploying in the system the model for image super-resolution processing that is trained according to embodiments of the present disclosure, the super-resolution processing 106 can be implemented between the cloud device 104 and the client 108, wherein the super-resolution processing 106 can be a model deployed with real-time updates or a model deployed with interval updates, depending on an actual usage and the computing power of a client, and the present disclosure is not limited in this regard. The original image 102 stored in the cloud device 104 is often compressed, resulting in a reduction in the resolution. With the super-resolution processing 106, continuous-scale enlargement of the image resolution can be achieved, while achieving sharp and clear super-resolution image reconstruction which brings better use experience to the user using the client 108.

The example environment 100 further includes the client 108, where the client 108 may be a desktop computer, a portable computer, a tablet computer, a mobile phone, and any other electronic device that can view images, and the present disclosure is not limited in this regard. In different clients 108, not only do the screen resolutions differ, but also the screen scales differ. Therefore, the super-resolution processing 106 is configured to enable continuous-scale resolution enlargement while achieving resolution enlargement with different scales in the length and the width of an image. It should be understood that the image resolution enlargement on the client 108 depends primarily on the device performance of the client 108 itself and the usage, and the present disclosure is not limited in this regard.

Although super-resolution processing of images in the scenario in which an image is uploaded to a cloud device is described above in conjunction with FIG. 1, it can be understood by a person skilled in the art that the image processing method according to embodiments of the present disclosure may not be limited to the above scenario, but may also be applied as needed to any scenario where super-resolution processing of images is required, and the present disclosure does not limit the application scenario. In a method according to an embodiment of the present disclosure, the image information is effectively utilized in the process of image super-resolution processing, and thus the image super-resolution processing effect can be greatly improved, and at the same time, the continuous-scale image super-resolution processing is achieved, so that it is possible to achieve different image resolution enlargement according to different client devices, without having to perform fixed enlargement of an integer multiple scale.

Figure 2:
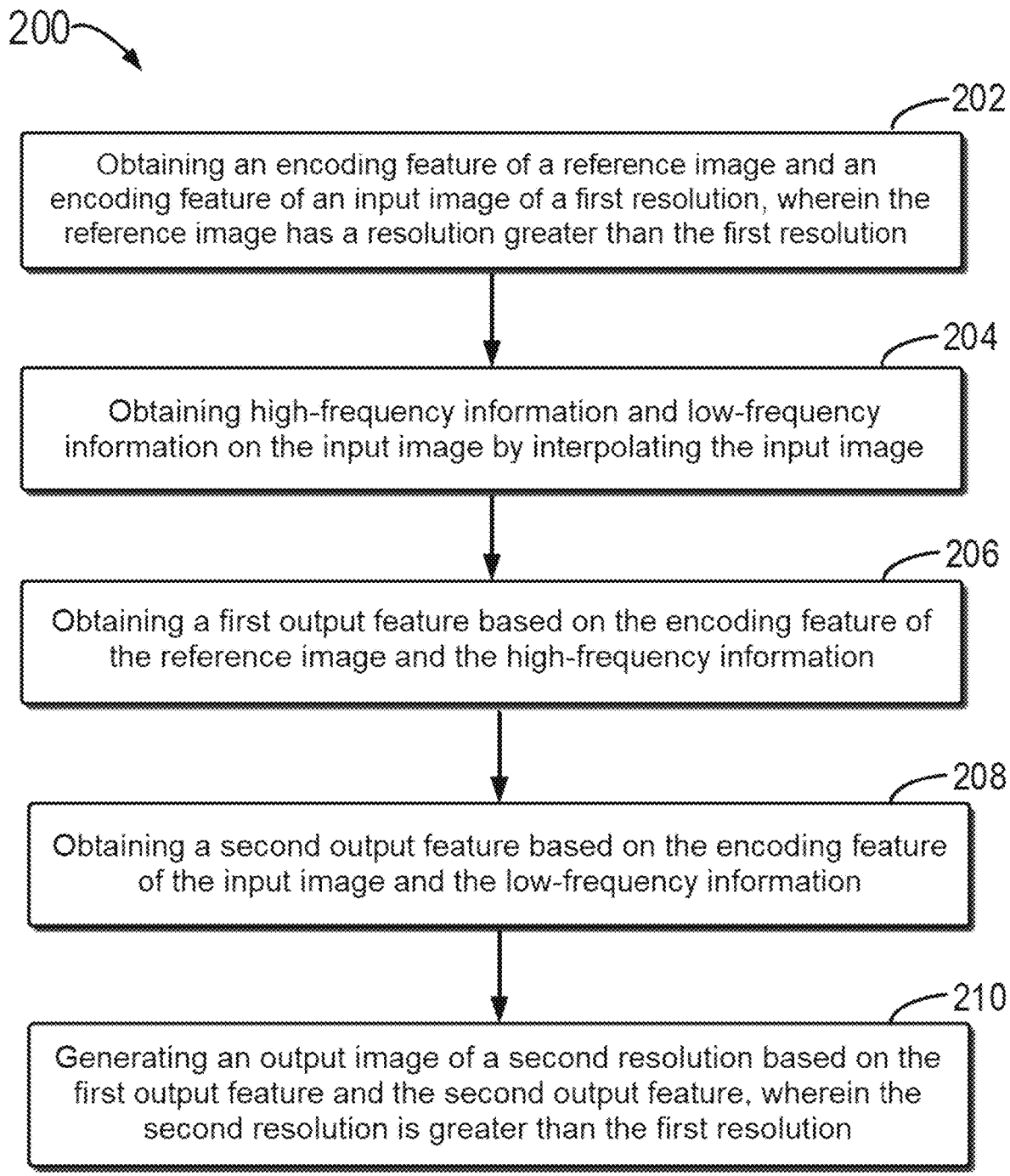
FIG. 2 illustrates an example flowchart for image processing according to an embodiment of the present disclosure.

FIG. 2 illustrates a flowchart 200 for image processing according to an embodiment of the present disclosure. At block 202, an encoding feature of a reference image and an encoding feature of an input image of a first resolution are obtained, wherein the reference image has a resolution greater than the first resolution. For example, during processing, a predefined reference image is first acquired, wherein the reference image contains edges and textures for image super-resolution processing, so as to complement the missing edges and textures in the input image and increase the resolution of the input image. In some embodiments, the reference image may be fixed during the model training stage, and thus can be used throughout the model deployment, use, and prediction stages. At the same time, the input image is an original low-resolution image, and the user wishes to achieve a continuous-scale enlargement of the resolution of the input image by means of image super-resolution processing, for example, an integer multiple such as 2×, 4×, 8×, etc., or a non-integer multiple such as 3.1×, 6.5×, 8.2×, etc. It should be understood that the enumeration of these numbers herein is not a limitation to the present disclosure, but rather an example of continuous-scale enlargement, and other integer scale and non-integer scale enlargement can also be achieved.

At block 204, high-frequency information and low-frequency information on the input image are obtained by interpolating the input image. For example, the input image is interpolated, so as to predict unknown data using known data, where one pixel point is given in the input image, and the value of that pixel point is predicted based on the information on the surrounding pixel points. The low-frequency information on the input image represents the region of the input image where the luminance or gray value changes slowly, that is, the large flat region of the input image, which describes the main part of the input image and is a comprehensive measure of the intensity of the input image, and the low-frequency part is relatively easy to process in the whole super-resolution processing. The high-frequency information on the input image corresponds to the part of the input image that changes drastically, that is, the edge (contour) or noise and detail part of the input image, which is mainly a measure of the edge and contour of the input image, whereas the human eye is sensitive to the high-frequency information, and the processing effect for the high-frequency information determines the final processing effect in the whole super-resolution processing. In some embodiments, the high-frequency information and the low-frequency information on the input image can be obtained by acquiring a spatial grid of the input image and performing interpolation on this spatial grid in the continuous scale, so as to obtain high-frequency features and low-frequency features of the image.

At block 206, a first output feature is obtained based on the encoding feature of the reference image and the high-frequency information. For example, by processing the high-frequency information on the reference image, the high-frequency information part of the input image can be better reconstructed. Since the reference image contains edges and textures for image super-resolution processing, its resolution is greater than the resolution of the input image. Therefore, using the encoding feature of the reference image to process the high-frequency information on the input image can better complement the details such as edges and textures that are missing in the high-frequency information on the input image. In some embodiments, the reference image is kept constant in both the training and use stages to ensure that the patterns in the reference image learned in the training stage can be migrated to the use stage, so the first output feature contains not only the high-frequency information on the input image, but also the high-frequency information complemented by the reference image, which is important for the overall image super-resolution processing.

At block 208, a second output feature is obtained based on the encoding feature and the low-frequency information of the input image. For example, by processing the low-frequency information on the input image, the low-frequency information part of the input image can be better reconstructed. Since the low-frequency information is representative of the region in the input image where the luminance or gray value changes slowly, whereas the human eye is not as sensitive to low-frequency information as it is to high-frequency information, it is possible to use only the input image itself to complement the part of low-frequency information to achieve a good processing effect. In some embodiments, the second output feature contains the high-frequency and low-frequency information on the input image, thus providing the low-frequency information needed for the whole image super-resolution processing.

At block 210, an output image of a second resolution is generated based on the first output feature and the second output feature, wherein the second resolution is greater than the first resolution. For example, based on the previous description, the first output feature contains the high-frequency information required for the image super-resolution processing, and the second output feature contains the low-frequency information required for the image super-resolution processing, so that based on the information contained in the first output feature and in the second output feature, a final output image, also referred to as a super-resolution image, can be generated, which has a resolution greater than that of the input image, thus achieving enlargement of the resolution of the input image. In some embodiments, a combined output feature is obtained by combining the first output feature and the second output feature, and a final output image is obtained through the combined output feature, wherein this output image achieves a sharp and clear super-resolution image reconstruction and achieves a continuous-scale enlargement of the low-resolution image.

In some embodiments, the solution of the present application includes a training stage and an application/inference stage, and the training stage for the image processing system according to an embodiment of the present disclosure is described below in connection with FIG. 3, and the application/inference stage for the image processing system according to an embodiment of the present disclosure is described below in connection with FIG. 4.

Figure 3:
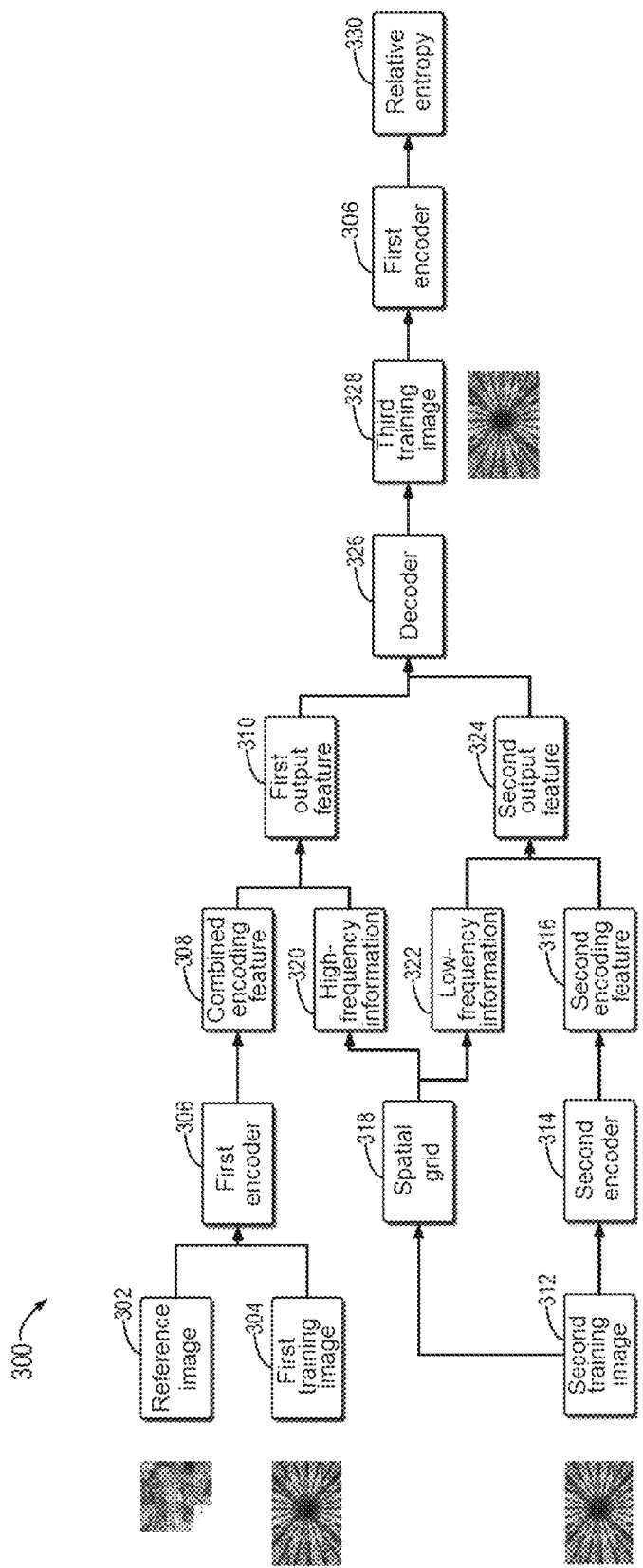
FIG. 3 illustrates a schematic diagram of training for an image processing system according to an embodiment of the present disclosure.

FIG. 3 illustrates a schematic diagram 300 of training for an image processing system according to an embodiment of the present disclosure. As shown in FIG. 3, a reference image 302 and a first training image 304 are input first, and the reference image 302 and the first training image 304 are then combined and input to a first encoder 306. For example, the reference image is a predefined image that contains edges and textures for image super-resolution processing, while the first training image is a high-resolution image that corresponds to a low-resolution image (e.g., a second training image 312), and is identical in terms of content but with a high resolution. After the reference image 302 and the first training image 304 are combined and input to the first encoder 306, a combined encoding feature 308 is obtained. For example, the combined encoding feature 308 obtained by the first encoder 306 is an implicit representation of the reference image 302 and the first training image 304 in a low-dimensional vector space, and the combined encoding feature 308 can represent the information of both. At the same time, since the purpose is to acquire, from the reference image 302 and the first training image 304, features of the high-frequency part for super-resolution processing, the combined encoding feature 308 contains many features of the high-frequency part for subsequent processing.

With continued reference to FIG. 3, the second training image 312 is input to a second encoder 314 to obtain a second encoding feature 316. For example, the second training image 312 may be a low-resolution image for processing, and the purpose of training the model is to enlarge the resolution of the second training image 312. In some embodiments, the parameters of the second encoder 314 may be the same as the parameters of the first encoder 306, and in some embodiments, the parameters of the second encoder 314 may not be the same as the parameters of the first encoder 306. In actual use, it is determined primarily by the model training effect whether the parameters of the second encoder 314 may be the same as the parameters of the first encoder 306, and the present disclosure is not limited in this regard. As mentioned above, the second encoding feature 316 is mainly derived from the second training image 312, and thus mainly contains the features of the low-frequency part, so it is also subsequently processed together with the low-frequency information 322 to realize the reconstruction of the low-frequency features for the second training image 312.

With continued reference to FIG. 3, a spatial grid 318 is obtained through the second training image 312, and the high-frequency information 320 and the low-frequency information 322 for the second training image 312 are obtained by means of continuous-scale interpolation of the spatial grid 318. For example, the spatial grid 318 records the pixel coordinate information on the second training image 312, so continuous-scale interpolation can be performed with the spatial grid 318, such as 2-fold interpolation, i.e., interpolation is performed once every two consecutive coordinates, or 2.5-fold interpolation, i.e., interpolation is performed three times between every three consecutive coordinates. The above examples of numerical values are used only to illustrate that the continuous-scale interpolation may include integer-multiple interpolation or non-integer multiple interpolation, and the specific numerical values are not limited in this disclosure. After the interpolation of the spatial grid 318, the high-frequency information 320 and low-frequency information 322 are acquired from the obtained result, wherein the low-frequency information 322 represents the region in the second training image 312 where the luminance or gray value changes slowly, that is, the large flat region in the second training image 312, which describes the main part of the second training image 312 and is a comprehensive measure of the intensity of the second training image 312, and the low-frequency part is relatively easy to process in the whole super-resolution processing. The high-frequency information on the second training image 312 corresponds to the part of the second training image 312 that changes drastically, that is, the edge (contour) or noise and detail part of the second training image 312, which is mainly a measure of the edge and contour of the second training image 312, whereas the human eye is sensitive to the high-frequency information, and the processing effect for the high-frequency information determines the final processing effect in the whole super-resolution processing. Therefore, in the subsequent processing, the high-frequency information 320 is complemented with the combined encoding feature 308.

With continued reference to FIG. 3, a first output feature 310 is acquired based on the combined encoding feature 308 and the high-frequency information 320, and a second output feature 324 is acquired based on the second encoding feature 316 and the low-frequency information 322. For example, since the combined encoding feature 308 is derived from the reference image 302 and the first training image 304, the combined encoding feature 308 contains rich high-frequency features, and the high-frequency features missing in the second training image 312 can be complemented by combining the combined encoding feature 308 and the high-frequency information 320, so as to obtain the first output feature 310. Conversely, since the second encoding feature 316 is derived from the second training image 312, and the second training image 312 has a lower resolution than those of the reference image 302 and the first training image 304, the second encoding feature 316 mainly contains low-frequency features, and the reconstruction of the low-frequency part of the second training image 312 is achieved by combining the second encoding feature 316 and the low-frequency information 322.

In some embodiments, in order to enhance the reconstruction of the high-frequency information 320, the first output feature 310 is acquired based on the combined encoding feature 308 and the high-frequency information 320, and coordinate encoding can be used to extend the input sparse points and uniform dots to the full frequency band of the frequency domain. Mathematically, we use a formula β to calculate the coordinates p as:

$$\beta(p) = \left(\sin(2^0 \pi p), \cos(2^0 \pi p), \ldots, \sin(2^{L-1} \pi p), \cos(2^{L-1} \pi p)\right) \quad (1)$$

where L is the frequency bandwidth or complexity. Such an arrangement is analogous in some respects to a neural tangent kernel (NTK). Embedding the coordinates in a multidimensional space can avoid "spectral bias" and force the network to be attenuated slowly in the high-frequency domain. Similarly, we are also interested in applying the same encoding scheme to the feature domain so that we can enforce image super-resolution as frequency domain interpolation. That is, the network learns to insert missing high-frequency features between low-frequency features. Therefore, illustrative embodiments are configured to combine the features of the low-frequency image and of the reference image by means of low-frequency coding and high-frequency coding. Given the low-frequency feature $F_l$ as well as the high-frequency feature $F_h$ that is based on the reference image, the following can be obtained:

$$F_h = \left(\sin(2^0 \pi F_r), \cos(2^0 \pi F_r), \ldots, \sin(2^{L-1} \pi F_r), \cos(2^{L-1} \pi F_r)\right) \quad (2)$$

$$F = F_l + conv(F_h)$$

where $F_r$ is the reference feature, $F_h$ is the high-frequency feature, $F_l$ is the low-frequency feature, and conv is a two-dimensional convolution process for compressing data in the high-frequency band.

With continued reference to FIG. 3, based on the acquired first output feature 310 and the acquired second output feature 324, the first output feature 310 and the second output feature 324 are combined and then input to a decoder 326 to obtain a third training image 328. For example, combining the first output feature 310 and the second output feature 324 may involve adding up vectors. The third training image 328 has the content corresponding to that of the second training image 312 and is the result obtained through the super-resolution processing of the second training image 312, and ideally, it is desired that the resolution of the third training image 328 is close to the resolution of the first training image 304. The model architecture of the present disclosure is similar to variational autoencoders (VAE), and has a first encoder 306 and a second encoder 314, and also a decoder 326. In terms of the training approach, the present disclosure draws on introspective variational autoencoders (IntroVAE). The parameters of the decoder 326 are first fixed so as to train the parameters of the first encoder 306 and the second encoder 314, and after the set criteria are satisfied, the parameters used to train the first encoder 306 and the second encoder 314 are then fixed so as to train the parameters of the decoder 326. Alternating training is used in the training to achieve the following purposes, respectively: training the encoders so that the encoders distinguish between the true data and the generated data; and training the decoder so that the data generated by the decoder is difficult to be distinguished by the encoder. Illustrative embodiments of the present disclosure provide, based on what is described above, encoding and generation of the training image under the condition of the reference image 302, and is therefore called a conditional introspective variational autoencoder, and the present disclosure better assists the super-resolution processing with the aid of the details and textures of the image contained in the reference image 302.

With continued reference to FIG. 3, the third training image 328 is input to the first encoder 306 to obtain the relative entropy 330 with the reference image 302. For example, by making the feature distribution of the third training image 328 to more closely resemble the feature distribution of the reference image 302, the third training image 328 can be made to have a resolution proximate to that of the reference image 302 and thus learn details such as edges and textures in the reference image 302, and this proximity is described by the relative entropy 330, which is used to train the entire model.

Figure 4:
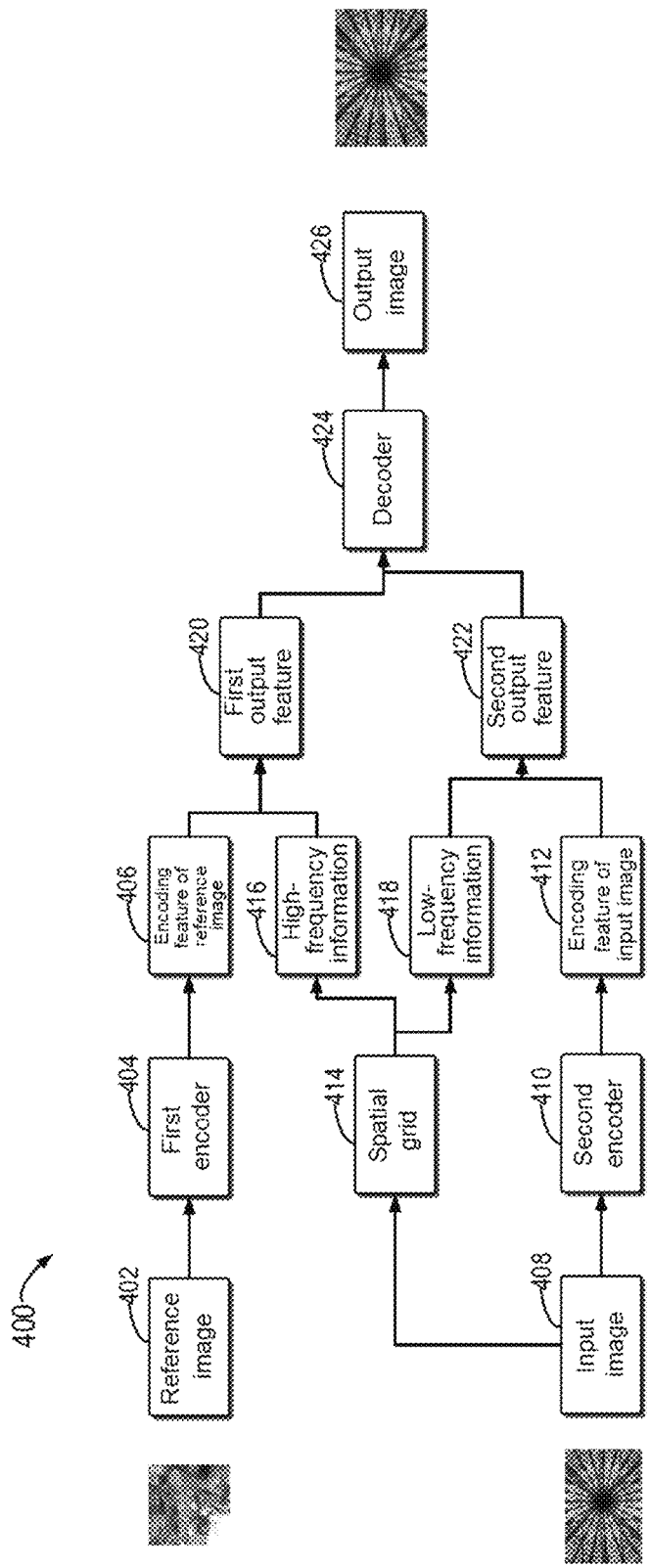
FIG. 4 illustrates a schematic diagram of an application for an image processing system according to an embodiment of the present disclosure.

FIG. 4 illustrates a schematic diagram 400 of an application for an image processing system according to an embodiment of the present disclosure. As shown in FIG. 4, a reference image 402 is first input to a first encoder 404 (the first encoder 404 may be the first encoder 306 trained with reference to FIG. 3) to obtain an encoding feature 406 of the reference image, where the reference image 402 is a fixed image predefined during training and continues to be used during deployment, prediction, and use processes. The first encoder 404 may extract an implicit feature representation of the reference image 402 to obtain the encoding feature 406 of the reference image. Since the reference image is an image that has a high resolution and also contains rich details and edges, the encoding feature 406 of the reference image accordingly contains rich high-frequency features that primarily complement high-frequency information 416 for an input image 408.

With continued reference to FIG. 4, the input image 408 is input to a second encoder 410 (the second encoder 410 may be the second encoder 314 trained with reference to FIG. 3) to obtain an encoding feature 412 of the input image. For example, the input image 408 is a low-resolution image that is processed by means of image super-resolution processing to enlarge the resolution of the input image 408. Since the input image 408 is a low-resolution image, the corresponding encoding feature 412 of the input image also contains mainly information on the low-frequency part.

With continued reference to FIG. 4, a spatial grid 414 is obtained through the input image 408, and the high-frequency information 416 and low-frequency information 418 for the input image 408 are obtained by means of continuous-scale interpolation of the spatial grid 414. After the interpolation of the spatial grid 414, the high-frequency information 416 and the low-frequency information 418 are acquired from the obtained result, wherein the low-frequency information 418 represents the region in the input image 408 where the luminance or gray value changes slowly, that is, the large flat region in the input image 408, which describes the main part of the input image 408 and is a comprehensive measure of the intensity of the input image 408, and the low-frequency part is relatively easy to process in the whole super-resolution processing. The high-frequency information on the input image 408 corresponds to the part of the input image 408 that changes drastically, that is, the edge (contour) or noise and detail part of the input image 408, which is mainly a measure of the edge and contour of the input image 408, whereas the human eye is more sensitive to the high-frequency information, and the processing effect for the high-frequency information determines the final processing effect in the whole super-resolution processing. Therefore, in the subsequent processing, the high-frequency information 416 is complemented with the encoding feature 406 of the reference image.

With continued reference to FIG. 4, a first output feature 420 is acquired based on the encoding feature 406 of the reference image and the high-frequency information 416, and a second output feature 422 is acquired based on the encoding feature 412 of the input image and the low-frequency information 418 of the input image. For example, the high-frequency information 416 is processed using the encoding feature 406 of the reference image, so as to complement the high-frequency feature; and similarly, the encoding feature 412 of the input image and the low-frequency information 418 of the input image are used to complement the low-frequency feature.

With continued reference to FIG. 4, based on the acquired first output feature 420 and the acquired second output feature 422, the first output feature 420 and the second output feature 422 are combined and then input to a decoder 424 (the decoder 424 may be the decoder 326 trained with reference to FIG. 3) to obtain an output image 426. For example, combining the first output feature 420 and the second output feature 422 may involve adding up vectors. The output image 426 has the content corresponding to that of the input image 408 and is the result obtained through the super-resolution processing of the input image 408.

Figure 5:
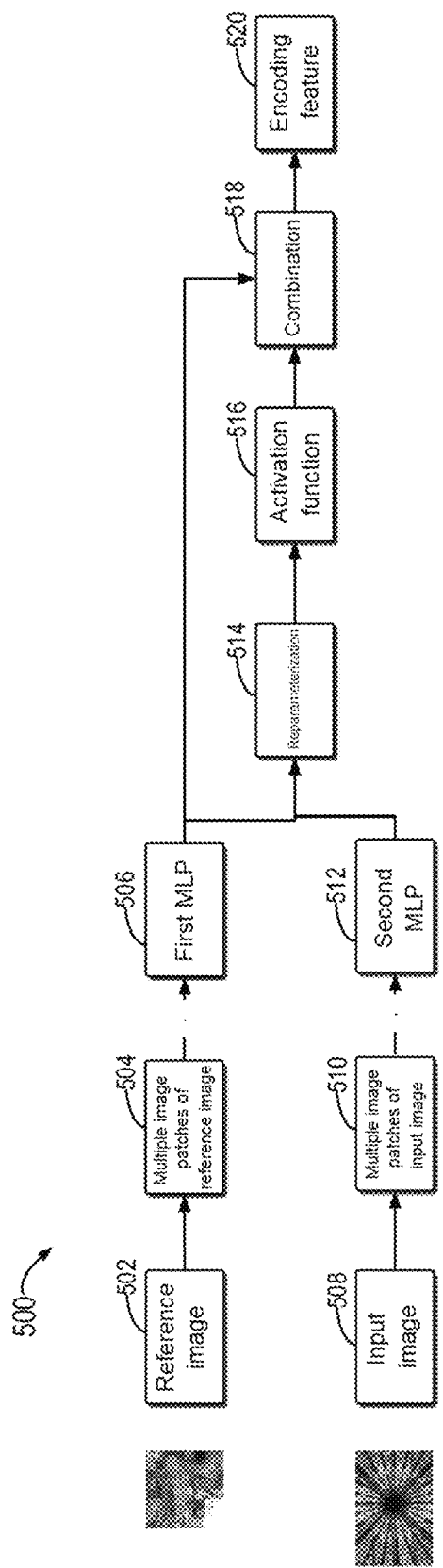
FIG. 5 illustrates a schematic diagram of an encoder for image processing according to an embodiment of the present disclosure.

FIG. 5 illustrates a schematic diagram 500 of a first encoder for image processing according to an embodiment of the present disclosure, wherein the first encoder may be the first encoder 306 trained with reference to FIG. 3. As shown in FIG. 5, a reference image 502 is input, and the reference image 502 is divided into multiple reference image patches 504, and the multiple reference image patches 504 are input to a first MLP 506 for feature extraction, wherein the first MLP is a multi-layer perceptron, which is a forward-structured artificial neural network. For example, the reference image may be divided into 8 reference image patches or 16 reference image patches, depending on the effect of model training, and the present disclosure is not limited in this regard. When dividing the reference image 502 into multiple reference image patches 504, the encoder processes one reference image patch at a time instead of processing the entire reference image 502, so that small patches of the reference image 502 can be processed in order to detect features such as edges and textures. Similarly, the input image 508 is divided into multiple input image patches 510, and the multiple input image patches 510 are input to a second MLP 512 for feature extraction. Next, the output result of the first MLP 506 and the output result of the second MLP 512 are input to a reparameterization module 514 to obtain a reparameterized result. When sampling from the distribution, because the action of sampling is discrete, the computation map cannot convey the gradient, and therefore the parameters cannot be updated. The reparameterization module 514 can ensure that sampling from the distribution is performed while also preserving the gradient information.

After the processing by the reparameterization module 514, the result is input to an activation function 516, for example, the activation function can be a SoftMax function. The output of the activation function 516 and the output of the first MLP 506 are then combined 518 to obtain an encoding feature 520.

Figure 6:
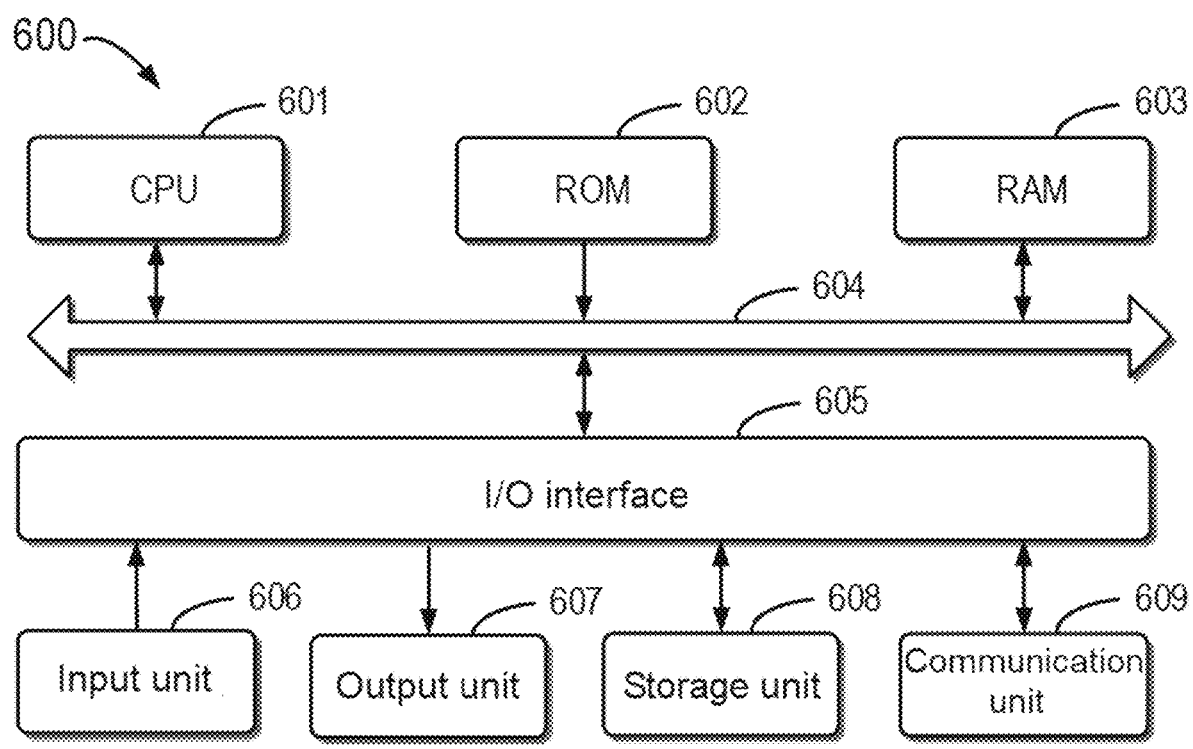
FIG. 6 illustrates a schematic block diagram of a device that can be used to implement embodiments of the present disclosure.

FIG. 6 is a schematic block diagram of a device 600 that may be used to implement embodiments of the present disclosure. The device 600 may be a device or an apparatus described in embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the CPU 601. For example, in some embodiments, the methods or processes can be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for image processing, comprising:
   obtaining an encoding feature of a reference image and an encoding feature of an input image of a first resolution, wherein the reference image has a resolution greater than the first resolution;
   obtaining high-frequency information and low-frequency information on the input image by interpolating the input image;
   obtaining a first output feature based on the encoding feature of the reference image and the high-frequency information;
   obtaining a second output feature based on the encoding feature of the input image and the low-frequency information; and
   generating an output image of a second resolution based on the first output feature and the second output feature, wherein the second resolution is greater than the first resolution.

2. The method according to claim 1, wherein obtaining the encoding feature of the reference image and the encoding feature of the input image comprises:
   processing the reference image using a first encoder to obtain the encoding feature of the reference image; and
   processing the input image using a second encoder to obtain the encoding feature of the input image.

3. The method according to claim 2, wherein processing the reference image using the first encoder comprises:
   processing, in the first encoder, features of a hidden layer in the first encoder by means of reparameterization; and
   inputting the processed features of the hidden layer to a fully connected layer in the first encoder.

4. The method according to claim 1, wherein interpolating the input image comprises:
   receiving a scale set by a user as a continuous scale, wherein the scale set by the user comprises an integer scale or a non-integer scale; and
   performing interpolation on the input image in the continuous scale.

5. The method according to claim 4, further comprising:
   determining continuous scales of the input image in width and in height that are set differently from each other.

6. The method according to claim 1, wherein generating the output image of the second resolution comprises:
   combining the first output feature and the second output feature to obtain a combined output feature; and
   processing the combined output feature using a decoder to obtain the output image.

7. The method according to claim 1, further comprising:
   obtaining a combined encoding feature based on the encoding feature of the reference image and an encoding feature of a first training image;
   obtaining an encoding feature of a second training image;
   obtaining high-frequency information and low-frequency information on the second training image by interpolating the second training image, wherein the first training image corresponds to the second training image, and the first training image has a resolution greater than that of the second training image; and
   obtaining a third training image based on the combined encoding feature, the encoding feature of the second training image, the high-frequency information on the second training image, and the low-frequency information on the second training image.

8. The method according to claim 7, wherein obtaining the third training image comprises:
   obtaining a third output feature based on the combined encoding feature and the high-frequency information on the second training image;
   obtaining a fourth output feature based on the encoding feature of the second training image and the low-frequency information on the second training image; and obtaining the third training image based on the third output feature and the fourth output feature.

9. The method according to claim 8, further comprising:
obtaining the encoding feature of the reference image and the encoding feature of the first training image using a first encoder;
obtaining the encoding feature of the second training image using a second encoder; and
processing the third output feature and the fourth output feature using a decoder to obtain the third training image.

10. The method according to claim 9, further comprising:
determining relative entropy of the third training image to the reference image; and
training the first encoder, the second encoder, and the decoder based on the relative entropy.

11. The method according to claim 10, wherein training the first encoder, the second encoder, and the decoder further comprises:
in a first training stage, fixing parameters of the decoder and training the first encoder and the second encoder; and
in a second training stage, fixing parameters of the first encoder and the second encoder and training the parameters of the decoder.

12. An electronic device, comprising:
a processor; and
a memory coupled to the processor, wherein the memory has instructions stored therein which, when executed by the processor, cause the electronic device to execute actions comprising:
obtaining an encoding feature of a reference image and an encoding feature of an input image of a first resolution, wherein the reference image has a resolution greater than the first resolution;
obtaining high-frequency information and low-frequency information on the input image by interpolating the input image;
obtaining a first output feature based on the encoding feature of the reference image and the high-frequency information;
obtaining a second output feature based on the encoding feature of the input image and the low-frequency information; and
generating an output image of a second resolution based on the first output feature and the second output feature, wherein the second resolution is greater than the first resolution.

13. The electronic device according to claim 12, wherein obtaining the encoding feature of the reference image and the encoding feature of the input image comprises:
processing the reference image using a first encoder to obtain the encoding feature of the reference image; and
processing the input image using a second encoder to obtain the encoding feature of the input image.

14. The electronic device according to claim 13, wherein processing the reference image using the first encoder comprises:
processing, in the first encoder, features of a hidden layer in the first encoder by means of reparameterization; and
inputting the processed features of the hidden layer to a fully connected layer in the first encoder.

15. The electronic device according to claim 12, wherein interpolating the input image comprises:
receiving a scale set by a user as a continuous scale, wherein the scale set by the user comprises an integer scale or a non-integer scale; and
performing interpolation on the input image in the continuous scale.

16. The electronic device according to claim 15, wherein the actions further comprise:
determining continuous scales of the input image in width and in height that are set differently from each other.

17. The electronic device according to claim 12, wherein generating the output image of the second resolution comprises:
combining the first output feature and the second output feature to obtain a combined output feature; and
processing the combined output feature using a decoder to obtain the output image.

18. The electronic device according to claim 12, wherein the actions further comprise:
obtaining a combined encoding feature based on the encoding feature of the reference image and an encoding feature of a first training image;
obtaining an encoding feature of a second training image;
obtaining high-frequency information and low-frequency information on the second training image by interpolating the second training image, wherein the first training image corresponds to the second training image, and the first training image has a resolution greater than that of the second training image; and
obtaining a third training image based on the combined encoding feature, the encoding feature of the second training image, the high-frequency information on the second training image, and the low-frequency information on the second training image.

19. The electronic device according to claim 18, wherein obtaining the third training image comprises:
obtaining a third output feature based on the combined encoding feature and the high-frequency information on the second training image;
obtaining a fourth output feature based on the encoding feature of the second training image and the low-frequency information on the second training image; and
obtaining the third training image based on the third output feature and the fourth output feature.

20. A computer program product that is tangibly stored on a non-transitory computer-readable medium and comprises machine-executable instructions, wherein the machine-executable instructions, when executed by a machine, cause the machine to perform the following actions:
obtaining an encoding feature of a reference image and an encoding feature of an input image of a first resolution, wherein the reference image has a resolution greater than the first resolution;
obtaining high-frequency information and low-frequency information on the input image by interpolating the input image;
obtaining a first output feature based on the encoding feature of the reference image and the high-frequency information;
obtaining a second output feature based on the encoding feature of the input image and the low-frequency information; and
generating an output image of a second resolution based on the first output feature and the second output feature, wherein the second resolution is greater than the first resolution.

* * * * *